United States Patent Office 2,813,079
Patented Nov. 12, 1957

2,813,079

PROCESS FOR TREATMENT OF GELS

Joseph D. Danforth, Grinnell, Iowa, assignor, by mesne assignments, to the United States of America as represented by the Secretary of the Navy No Drawing. Application February 14, 1955,
Serial No. 488,172

3 Claims. (Cl. 252—317)

This invention relates to an improved process for treating gels and jelly substances. More particularly, this invention relates to a novel process for impregnating dried gels and similar substances with aqueous solutions without causing a breakdown of the material into a fine powder. By avoiding this disintegration or decrepitation which normally accompanies the impregnation of many solid gels with an aqueous solution, it becomes possible to eliminate operations aimed at increasing the particle size of the treated material to provide the same in a usable form for various applications.

Frequently, in the processing of gels and jelly materials in the preparation of various products, it becomes necessary to dry the gel at one stage and thereafter to subject the solid gel to treatment with various aqueous solutions to modify the properties thereof. The process of treating the gel or other adsorptive support with an aqueous solution is commonly referred to as impregnation. Many dehydrated gels or jellies upon direct contact with aqueous solutions during impregnation thereof or upon treatment with polar liquids, such as acetone, alcohol, etc., crack and break up whereby the larger particles initially present in the preparation are reduced to a fine powder. This occurrence, which is herein referred to as decrepitation, is frequently encountered in various gels and similar materials including silica gel, siliceous gel catalysts, and numerous other commercial gels.

For specific applications as, for example, in the preparation of catalysts from silica gel and gels of other hydrous oxides, the aforesaid reduction of particle size upon contact of the dried gel with an aqueous solution or other polar liquids is undesirable since the material in the form of a fine powder is not suitable for use without further treatment. The use of the catalyst in powder form in applications such as the fixed bed reactor or in other types of equipment causes plugging or presents other operational difficulties. It therefore becomes necessary to compact the powder into the form of pills or pellets prior to its use in catalytic reactions. Pilling or pelleting operations for converting the powder into usable form are expensive and time consuming. It becomes readily apparent therefore that a process for impregnating a gel or similar material with any desired aqueous solution without the aforesaid decrepitation would be highly advantageous, particularly for processing catalysts of various types.

It is accordingly an object of the invention to provide a process for treating solid gels and related substances which undergo decrepitation upon contact with aqueous solutions in a manner whereby the tendency of the material to crumble into a fine powder is substantially overcome.

It is another object of the invention to provide a process for producing impregnated catalytic preparations from gels of the metal-oxide type in a granular form suitable for use without requiring pilling, pelleting or otherwise compacting the material prior to its use.

A further object of the invention is to provide an improved process for impregnating dehydrated gels and jellies with polar fluids of an organic or inorganic type for modifying the properties thereof.

Other objects and advantages will become apparent as the specification proceeds.

I have now discovered that gels and related substances which ordinarily undergo decrepitation when the dehydrated forms thereof are brought directly into contact with a polar liquid may be pretreated to avoid the breakdown of the mass into an amorphous powder. The pretreatment consisting essentially of the wetting of the solid gel with an organic nonpolar liquid followed by removal of the nonpolar liquid from the system by means of a water-miscible organic polar liquid having substantial solvent action therefor provides a basis for obtaining the material in non-decrepitated form. The more important applications include the further processing of the pretreated gel with any aqueous-impregnating medium desired for modifying the chemical properties of the gel. The impregnated material can thus be obtained directly, without special compacting procedures, in sufficiently large particles to permit its use in some catalytic operations or for any other purposes for which the increased particle or granular size may be desirable.

Gels and jelly substances which may be used in the process are of the most varied type and character. In its broader aspects, colloids comprising gels, jellies and gelatinous precipitates are included which decrepitate when the material in its substantially dried or solid state is brought into contact with polar liquids, particularly aqueous solutions. Since impregnation with aqueous solutions is frequently carried out in the preparation of catalysts for various types of chemical reactions, the gels and related forms such as the jellies and gelatinous precipitates of the hydrous oxides commonly used in catalytic preparations are of considerable importance. This group includes silica gel and gelatinous precipitates such as the hydrous oxides of chromic, thallic, stannous, aluminum, gallium, indium, titanium, zirconium, thorium, etc. The solid gels of silica, alumina, zirconia, and others including composites thereof such as chromia-alumina, silica-alumina, silica-zirconia, silica-alumina-zirconia and numerous others, when prepared by drying of the wet gel form glassy porous particles of high surface area. Impregnation of the solid gel is frequently desirable for the purpose of modifying the properties of the preparation as when the porous particles are used as catalytic carriers for metals such as platinum, palladium, nickel, etc. which may be dispersed thereon by the use of appropriate aqueous solutions. Other reasons for impregnating the solid gels include the addition of specific substances which are known to impart specificity of action among several possible reactions which may occur in a chemical system, or to act as promoters or inhibitors and the like.

A preferred gel primarily because of its extensive availability and widespread usage in numerous applications is silica gel which may be obtained from its hydrogel produced by acidification of sodium silicate under controlled conditions of pH. One method of obtaining silica gel from the hydrogel involves the dehydration of the hydrogel at about 300° C. at reduced pressure until the water content is lowered to about 5 to 7%. Another method of obtaining the solid gel is to discharge the mixture of acid and sodium silicate from a rotating disc or nozzle into an oil bath in a manner conducive to the formation of spherical bodies which are removed from the oil as formed. Composites may be similarly processed by co-precipitation methods to produce the solid gels suitable for impregnation.

The impregnation step, as previously indicated, may involve the use of one or more substances soluble in water including either acidic, basic or normal salt solutions. In my copending application, Serial No. 266,541, filed January 15, 1952, catalysts of the acidic solid oxide type impregnated with alkali- or alkaline-earth metal solutions to significantly modify the properties of the catalyst are described in detail. Examples of aqueous-impregnating solutions disclosed therein as useful for replacing the active acid proton in the acidic oxide component or composite catalyst include the soluble nitrates, chlorides, etc. and preferably the hydroxides of lithium, sodium, potassium, rubidium, cesium, calcium, strontium and barium. Other impregnating solutions consisting of inorganic acids as the mineral acids or soluble organic acids such as acetic acid may be used in appropriate quantities and concentrations to condition or modify the properties of the solid gel as desired. Aqueous solutions of metal salts such as chloroplatinic acid, chloropalladic acid, etc. are commonly used for depositing the metal on the carrier gel by conventional impregnation techniques.

In order to improve the granulation of the impregnated substance by minimizing the decrepitating tendency of the solid gel, it is essential to treat the dried or substantially dehydrated colloid herein referred to as a solid gel with the nonpolar and polar organic wetting reagents respectively prior to impregnating the gel with one or more of the aforesaid aqueous solutions. In some cases wherein contact with a nonaqueous polar liquid constitutes the only desired treatment of the gel, decrepitation of the dried gels which may otherwise occur may be largely minimized or completely eliminated by the preliminary treatment with the nonpolar liquid.

The preliminary wetting liquid suitable for use in the present invention may be any nonaqueous organic liquid of the nonpolar type such as the saturated members of hydrocarbon series including aliphatic and alicyclic compounds. Pentane, hexane, heptane, octane, cyclopentane, cyclohexane and many other compounds including benzene petroleum ether and other mixtures of nonpolar liquids may be used. Excellent results are obtained when benezne is used in the processing of silica gel catalysts including composites thereof. The quantity of nonpolar liquid to be used and the manner in which it is brought into contact with the solid gel is not particularly important providing the gel is completely wet thereby. It is sufficient to merely cover the gel with the liquid.

The polar solvents used in conjunction with the above designated nonpolar liquids which are most suitable for the process possess the properties of having at least a significant degree of solubility between it and the nonpolar liquid, and also of being completely miscible with water. The solubility between polar and nonpolar liquids varies considerably depending upon the liquid combination used, temperatures, etc. In general, the solubility of the one in the other is sufficient if the nonpolar liquid can be washed away or replaced substantially in its entirety from the gel-containing mixture without requiring execssive quantities of the polar liquids. Organic polar compounds meeting these requirements include various low molecular-weight alcohols, ketones, aliphatic amines, etc. such as methyl, ethyl, propyl, isopropyl, tert. butyl alcohols, ethylene or propylene glycols, glycerine, acetone, methyl ethyl ketone, ethylamine butylamine, etc. Ethanol or acetone are the preferred polar solvents for replacing the nonpolar liquid in the gel system.

The nonpolar liquid replacement step may be carried out by any convenient process. One satisfactory method of treatment consists of adding the polar liquid after the solid gel has been wet by the nonpolar liquid, and thereafter removing the latter by washing with the polar liquid. The aqueous-impregnating medium is then added with no appreciable breaking up of the gel particles. The process may be readily adapted for continuous operation as, for example, by transferring the solid gel from one liquid medium to another in accordance with the designated sequence until the cycle has been completed.

The dried, calcined, or otherwise processed impregnated gel or jelly characterized by the marked granulation contrasted with the amorphous powders heretofore attained may be used directly or in the case of some catalytic preparations may be further processed as by reduction in a stream of hydrogen at elevated temperatures to activate the product. The enhanced particle size can ordinarily be maintained throughout such subsequent processing step.

The invention is further illustrated in the following examples, but is not to be construed as limited to details described therein.

Example I

A commercially available granular silica gel preparation was found upon analysis to contain 0.33% alumina, an impurity which tends to promote the decomposition of organic compounds through cracking. For certain uses therefore it becomes highly desirable to reduce the alumina content of the silica gel to a minimum concentration.

The addition of aqueous acids to the granules caused each granule to break up into a fine powder, thereby making the gel unfit for use in fixed catalyst bed applications.

To overcome the decrepitation, 100 g. (130 ml.) of the silica gel were covered with 100 ml. of beneze and 25 ml. of acetone were slowly added thereto. The benzene-acetone mixture was decanted from the silica gel which was then washed with a further quantity (75 ml.) of acetone to remove all of the benzene. Following decantation of the acetone, the gel was washed and rinsed several times with sufficient quantities of distilled water to effectively remove all the acetone. The distilled water was next decanted and the gel was covered with 100 ml. of concentrated hydrochloric acid (36%). After standing overnight, the hydrochloric acid was decanted and the gel washed with distilled water until the wash waters tested chloride free. The gel, after being dried overnight at 100° C., upon analysis for alumina ($Al_2O_3$) indicated the presence of less than .01% by weight. The granulation of the silica gel, however, was substantially unaltered in that the material was recovered in the granular form of the original gel.

Example II

The process of Example I was repeated with the exception that cyclohexane was used in the place of benzene and ethanol was used in lieu of acetone. The acid-treated product contained only a trace amount of alumina and possessed a degree of granulation comparable to that of the original silica gel.

Example III

The process as set forth in Example I was repeated with the exception that an aqueous solution of lithium hydroxide was used in the place of the hydrochloric acid. No decrepitation was observed in the dried impregnated product thereby making the treated product acceptable for use as is in fixed bed catalyst reactors.

As many apparently widely differing embodiments of this invention may be made without departing from the spirit and scope thereof, it is to be understood that this invention is not limited to the specific embodiments thereof except as defined in the appended claims.

I claim:

1. A process in which silica gel is to be contacted with an aqueous solution which comprises wetting the silica gel by contacting it with a liquid hydrocarbon of boiling point in the range from about 36 to 125° C., removing the liquid hydrocarbon from the silica gel by washing with a polar organic solvent for the liquid hydrocarbon selected from the group consisting of water-miscible alcohols and ketones, removing the polar organic solvent from the silica gel by washing with water, and contacting the so-treated silica gel with an aqueous solution.

2. A process in which silica gel is to be contacted with an aqueous solution which comprises wetting the silica gel by contacting it with benzene, removing the benzene from the silica gel by washing with acetone, removing the acetone from the silica gel by washing with water, and contacting the silica gel with an aqueous solution.

3. A process in which silica gel is to be contacted with an aqueous solution which comprises wetting the silica gel by contacting it with cyclohexane, removing the cyclohexane from the silica gel by washing with ethyl alcohol, removing the ethyl alcohol from the silica gel by washing with water, and contacting the silica gel with an aqueous solution.

No references cited.